United States Patent
Inada et al.

(10) Patent No.: US 8,933,936 B2
(45) Date of Patent: Jan. 13, 2015

(54) IMAGE PROCESSING SYSTEM, IMAGE PROVIDER SERVER, INFORMATION PROCESSING DEVICE, AND IMAGE PROCESSING METHOD, ADAPTED TO CHANGE IN RESOLUTION

(75) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 222 days.

(21) Appl. No.: 13/608,101

(22) Filed: Sep. 10, 2012

(65) Prior Publication Data

US 2013/0167031 A1  Jun. 27, 2013

(30) Foreign Application Priority Data

Dec. 27, 2011  (JP) .................. 2011-286970

(51) Int. Cl.
 *G06T 17/00* (2006.01)
 *G06T 3/40* (2006.01)
(52) U.S. Cl.
 CPC ................... *G06T 3/4092* (2013.01)
 USPC ........... 345/428; 345/619; 345/698; 715/716; 715/815; 715/848
(58) Field of Classification Search
 CPC ................................................. G06T 3/4092
 USPC .......... 715/716, 700, 815, 848; 345/619, 428, 345/698
 See application file for complete search history.

(56) References Cited

U.S. PATENT DOCUMENTS

| 6,563,999 | B1 | 5/2003 | Suzuoki |
| 7,453,479 | B2 * | 11/2008 | Le et al. ........................ 345/698 |
| 7,554,543 | B2 * | 6/2009 | Aguera Y Arcas ............ 345/428 |
| 7,830,381 | B2 * | 11/2010 | Lundstrom et al. .......... 345/428 |
| 8,331,701 | B2 * | 12/2012 | Ohba et al. .................... 382/232 |
| 8,400,451 | B2 * | 3/2013 | Peterson ....................... 345/428 |
| 8,462,151 | B2 * | 6/2013 | Yaron et al. ................... 345/419 |

(Continued)

FOREIGN PATENT DOCUMENTS

| JP | 2004070712 A | 3/2004 |
| JP | 2005223397 A | 8/2005 |

(Continued)

OTHER PUBLICATIONS

The Office Action issued for corresponding Japanese Patent Application No. 2011-286970, dated Sep. 17, 2013.

*Primary Examiner* — William Titcomb
(74) *Attorney, Agent, or Firm* — Matthew B. Dernier, Esq.; Gibson & Dernier LLP

(57) ABSTRACT

Moving image data is delivered from an image provider server. A hierarchical data generation device decodes the moving image data and generates data for the moving image representing each frame in a plurality of resolutions, by reducing frames included in the moving image in a single or multiple stages. A decoder reads only data for a layer in the hierarchical data for each frame, the layer being determined by a resolution requested for display, and decodes the read data. This produces a series of frames representing frames in a requested resolution. A display device displays the frames so that the moving image is displayed in the requested resolution.

15 Claims, 9 Drawing Sheets

(56) References Cited

U.S. PATENT DOCUMENTS

| | | | |
|---|---|---|---|
| 8,531,488 B2* | 9/2013 | Ohba et al. | 345/672 |
| 8,571,338 B2* | 10/2013 | Inada et al. | 382/240 |
| 8,615,721 B2* | 12/2013 | Hara | 715/838 |
| 8,724,914 B2* | 5/2014 | Inada | 382/240 |
| 2002/0191867 A1* | 12/2002 | Le et al. | 382/300 |
| 2008/0069458 A1* | 3/2008 | Vega-Higuera et al. | 382/232 |
| 2008/0134070 A1* | 6/2008 | Kobayashi et al. | 715/767 |
| 2008/0150937 A1* | 6/2008 | Lundstrom et al. | 345/419 |
| 2009/0007019 A1* | 1/2009 | Kobayashi et al. | 715/838 |
| 2009/0164567 A1* | 6/2009 | Hara | 709/203 |
| 2010/0040297 A1* | 2/2010 | Ohba et al. | 382/232 |
| 2010/0231593 A1* | 9/2010 | Zhou et al. | 345/428 |
| 2011/0142321 A1* | 6/2011 | Huffman | 382/131 |
| 2011/0221780 A1* | 9/2011 | Inada et al. | 345/660 |
| 2011/0261049 A1* | 10/2011 | Cardno et al. | 345/419 |
| 2011/0273470 A1* | 11/2011 | Ohba et al. | 345/619 |
| 2012/0001915 A1* | 1/2012 | Peterson | 345/428 |
| 2012/0005630 A1* | 1/2012 | Ohba et al. | 715/853 |
| 2012/0105469 A1* | 5/2012 | Pascucci | 345/600 |
| 2012/0139949 A1* | 6/2012 | Ohba et al. | 345/660 |
| 2012/0216110 A1* | 8/2012 | Kariya et al. | 715/234 |
| 2012/0268465 A1* | 10/2012 | Inada | 345/428 |
| 2012/0287152 A1 | 11/2012 | Kunigita | |
| 2013/0038604 A1* | 2/2013 | Yaron et al. | 345/419 |
| 2013/0135347 A1* | 5/2013 | Inada et al. | 345/629 |
| 2013/0176211 A1* | 7/2013 | Inada et al. | 345/156 |

FOREIGN PATENT DOCUMENTS

| | | |
|---|---|---|
| JP | 2006260059 A | 9/2006 |
| WO | 2011067899 A1 | 6/2011 |

* cited by examiner

IMAGE PROCESSING SYSTEM, IMAGE PROVIDER SERVER, INFORMATION PROCESSING DEVICE, AND IMAGE PROCESSING METHOD, ADAPTED TO CHANGE IN RESOLUTION

BACKGROUND OF THE INVENTION

1. Field of the Invention

The present invention relates to an image processing technology for displaying moving images and still images on a display.

2. Description of the Related Art

Home entertainment systems are proposed capable of playing back moving images as well as running game programs. In such a home entertainment systems, a GPU generates three-dimensional images using polygons (see, for example, U.S. Pat. No. 6,563,999).

In order to display a variety of still images or moving images in a terminal controlled by a user, sufficient resources such as a storage device for storing data for requested images should be secured. Further, in an embodiment in which images are displayed as the displayed area is moved in response to an input for user control, a user input desirably produces satisfactory response even in the case of a high-definition image. Meanwhile, the display environment considered as optimum by users varies depending on the performance of a terminal or the purpose of displaying images. In a present-day environment where an enormous amount of content is available via a network, there is called for a technology capable of selecting a combination of a plurality of elements including content, quality, and responsiveness at will.

RELATED ART LIST

U.S. Pat. No. 6,563,999

SUMMARY OF THE INVENTION

The present invention addresses the aforementioned challenge and a purpose thereof is to provide a technology capable of displaying a variety of images in an environment suited to a user request.

One embodiment of the present invention relates to an image processing system. The image processing system comprises an information terminal configured to display an image in response to a user operation, and a server connected to the information terminal via a network and configured to transmit image data to the information terminal, the information terminal comprising: a user operation information transmission unit configured to receive user operation input for requesting a change in a size of an image subject to display and to transmit information related to the user operation input to the server; and a displayed image processing unit configured to display an image by using data for a display screen that is transmitted from the server in response to the user operation input and in which a size of the image subject to display is changed, the server comprising a hierarchical data generation device configured to generate hierarchical data representing the image subject to display in a plurality of resolutions and hierarchized in the order of resolution; and a displayed image processing device which comprises: a decoder unit configured to switch and decode a layer in the hierarchical data subject to decoding process in accordance with a change in a display resolution of the image subject to display in the information terminal, the change being indicated by the user operation input transmitted from the information terminal; a display screen generation unit configured to generate the data for the display screen including the decoded image subject to display; and a data transmission unit configured to transmit the data for the display screen to the information terminal.

Another embodiment of the present invention relates to an image provider server. The image provider server comprises: a user operation information reception unit configured to receive information related to user operation input requesting a change in a size of an image subject to display from an information terminal connected via a network; a hierarchical data generation unit configured to generate hierarchical data representing the image subject to display in a plurality of resolutions and hierarchized in the order of resolution; a decoder unit configured to switch and decode a layer in the hierarchical data subject to decoding process in accordance with a change in a display resolution of the image subject to display in the information terminal, the change being indicated by the information related to the user operation input; a display screen generation unit configured to generate data for a display screen including the decoded image subject to display; and a data transmission unit configured to transmit the data for the display screen to the information terminal so as to display the display screen in which a size of the image subject to display is changed.

Still another embodiment of the present invention relates to an information processing device. The information processing device comprises: a hierarchical data generation unit configured to generate hierarchical data representing each frame of a moving image in a plurality of resolutions and hierarchized in the order of resolution; an input unit configured to acknowledge user operation input requesting a change in the number of concurrently displayed images while moving images are being displayed; a decoder unit configured to switch and decode a layer in the hierarchical data subject to decoding process when a display resolution of a moving image subject to display is changed in response to user operation input; and a display unit configured to generate and display data for a display screen including a decoded moving image.

Yet another embodiment of the present invention relates to an image processing method. An image processing method implemented by an information terminal configured to display an image in response to a user operation, and a server connected to the information terminal via a network and configured to transmit image data to the information terminal, the method comprising: receiving, in the information terminal, user operation input requesting a change in a size of an image subject to display and transmitting the user operation input to the server; generating, in the server, hierarchical data representing the image subject to display in a plurality of resolutions and hierarchized in the order of resolution; switching and decoding, in the server, a layer in the hierarchical data subject to decoding process in accordance with a change in a display resolution of the image subject to display in the information terminal, the change being indicated by the user operation input transmitted from the information terminal; generating, in the server, the data for a display screen including the decoded image subject to display; transmitting, from the server, the data for the display screen to the information terminal; and displaying, in the information terminal, an image by using data for the display screen which is transmitted from the server in response to the user operation input and in which a size of the image subject to display is changed.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
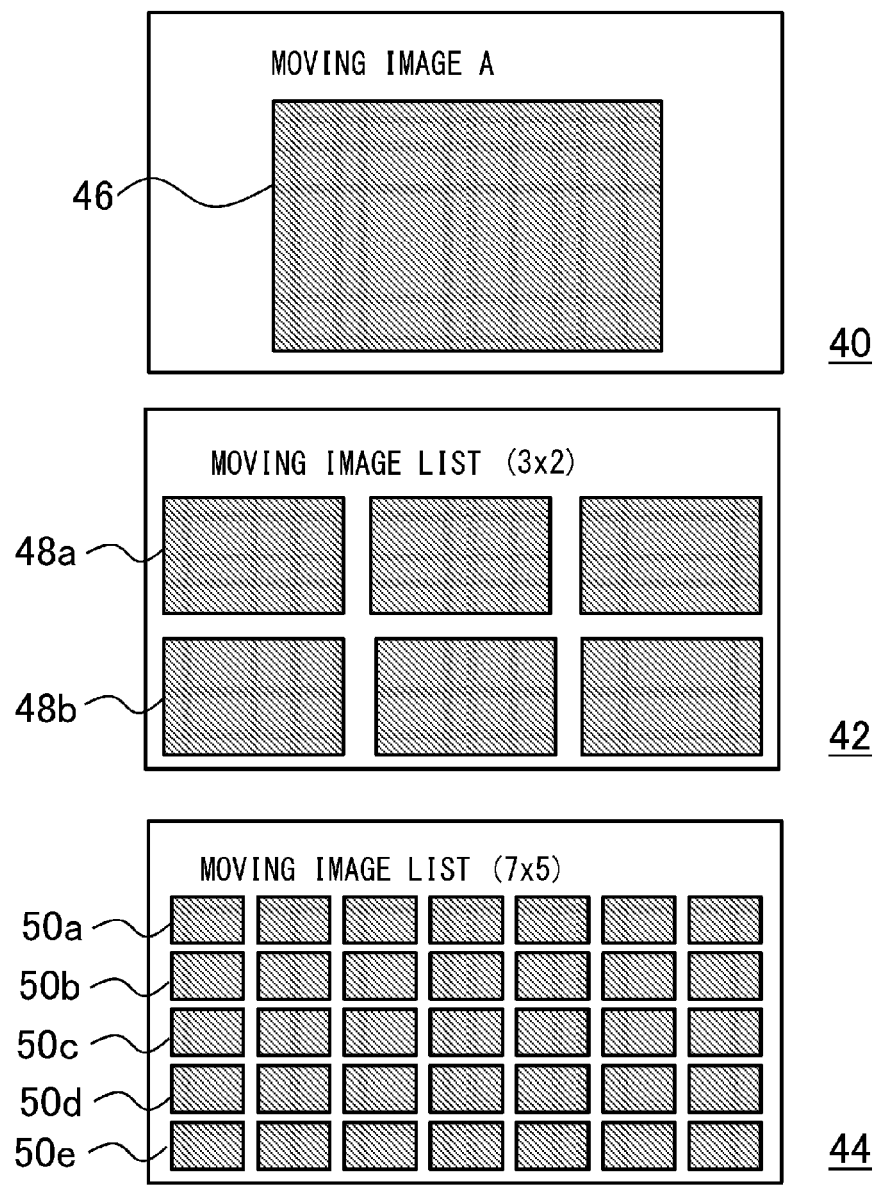
FIG. 1 shows exemplary display screens that can be achieved by the embodiment.

The embodiment provides capabilities of changing the resolution of moving images or still images being displayed in response to, for example, a user operation. FIG. 1 shows exemplary display screens that can be achieved by the embodiment. Screens 40, 42, and 44 are exemplary screens in which moving images retrieved from a moving image provider server via a network are displayed on an information terminal. Each hatched rectangle represents a moving image.

The screen 40 shows an image 46 of "moving image A", which is selected by the user in the information terminal. Meanwhile, the screen 42 shows a moving image list (3×2), which comprises an array of 3 moving images horizontally and 2 moving images vertically (e.g., images 48a, 48b). Further, the screen 44 shows a moving image list (7×5), which comprises an array of 7 moving images horizontally and 5 moving images vertically (e.g., images 50a-50e).

Transition between the screens 40, 42, and 44 takes place discontinuously in response to the user's input for selection in a menu screen (not shown). Alternatively, a virtual image comprising an array of all moving images that should be listed as in the screen 44 may be generated so that the displayed area is continuously changed in response to a user operation to enlarge, reduce, or scroll the image. In either case, the resolution of the moving images displayed in the screens 40, 42, and 44 changes in response to a user operation. Not only moving images but also a mixture of moving images and still images or still images only may be displayed in the array.

Such a change in the screen allows the user to view a plurality of available moving images at a glance and provides efficient means of selecting an image. Meanwhile, the data for the images are encoded on an assumption that the images are displayed individually. Therefore, the larger the number of images concurrently displayed, the larger the amount of resources consumed for decoding processes and data transfer. For example, the screen 44 will consume 35 times more resources than the screen 40 for decoding processes and transfer bandwidth.

Increase in the amount of resources consumed such as this could produce a disadvantage particularly when moving images are displayed. For example, it will be difficult to display images on time and frames are dropped accordingly. The embodiment addresses this by converting image data supplied from a source into image data having a plurality of resolutions earlier than the decoding process for displaying images. Further, the resolution of image data subject to decoding is switched depending on the resolution required for display. Consequently, the amount of resources consumed subsequent to the conversion of image data will primarily depend on the screen size of the display device for displaying the images and will not be dependent on the number of images that should be decoded. Moving images will be described by way of example in the following description, but the description equally applies to still images.

Figure 2:
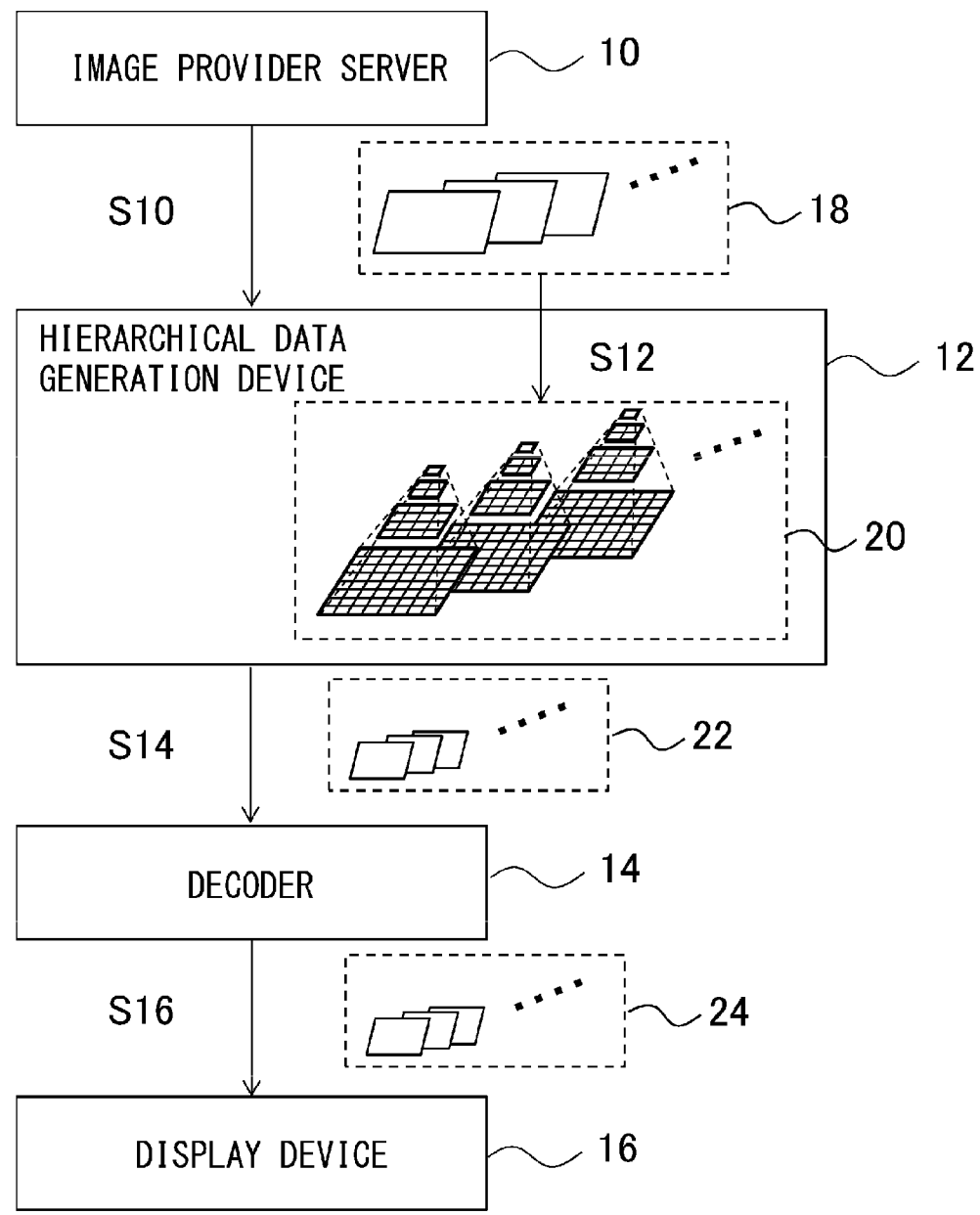
FIG. 2 schematically shows an exemplary device configuration and transition of image data according to the embodiment.

FIG. 2 schematically shows an exemplary device configuration and transition of image data according to the embodiment. The figure shows only one item of moving image data. To display a plurality of moving images concurrently, a similar process is performed on the other items of moving image data. For ease of understanding, encoded data are equally illustrated as a series of frames. Initially, moving image data is delivered by an image provider server 10 (S10). The moving image data delivered comprises a typical encoded series of frames 18 representing the moving image in a single resolution. The moving image data is initially supplied to a hierarchical data generation device 12. The data may be supplied by downloading a file or by being delivered as a stream.

The hierarchical data generation device 12 decodes the moving image data and generates data 20 for a moving image representing each frame in a plurality of resolutions, by reducing the frames included in the decoded data in a single stage or in multiple stages (S12). By hierarchizing the images of a plurality of resolutions thus generated in the order of resolution, it will be easy to map the resolution required for display to the data. Hereinafter, image data having hierarchized as this will be referred to as "hierarchical data".

Of the hierarchical data corresponding to each frame, the decoder 14 then reads and decodes only data 22 determined by the resolution required for display (S14). This allows a series of frames 24 in which each frame is represented in the required resolution to be obtained. By displaying the series of frames 24 using the display device 16, the moving image is displayed at the requested resolution (S16). According to such a configuration, the bandwidth required to transfer data from the hierarchical data generation device 12 and the amount of resources required by the decoder 14 to decode a single moving image are reduced as the resolution required for display is reduced.

Since the number of moving images concurrently displayed and the display resolution of individual moving images are in inversely proportional to each other, the amount of resources required to process data subsequent to the process in the hierarchical data generation device 12 remains constant irrespective of the number of moving images, even if a large number of moving images are concurrently displayed as in the screen 44 of FIG. 1. By connecting the hierarchical data generation device 12 to a plurality of decoders 14 and display devices 16 so as to share hierarchical data, the load imposed on processing in the hierarchical data generation device 12 per a single display device 16 is reduced so that variation in the amount of resources consumed in the system as a whole is reduced. A similar advantage will be obtained by distributing the load by processing each image at a different timing in the hierarchical data generation device 12.

Figure 3:
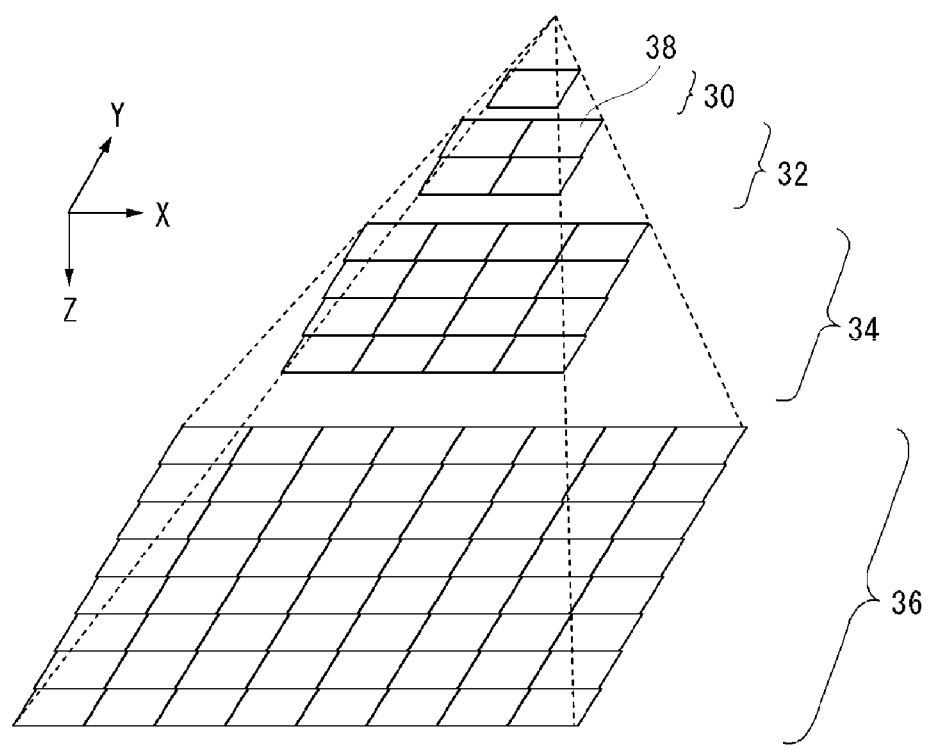
FIG. 3 schematically shows hierarchical data generated according to the embodiment.

FIG. 3 schematically shows hierarchical data. The hierarchical data has a hierarchical structure comprising a 0-th layer 30, a first layer 32, a second layer 34, and a third layer 36 in the direction of depth (Z axis). While the figure only shows four layers, the number of layers is nonrestrictive.

The hierarchical image data shown in FIG. 3 has a quadtree hierarchical structure. Each layer comprises one or more tile images 38. All of the tile images 38 are formed to have the same size having the same number of pixels. For example, an image includes 256 256 pixels. The image data in the respective layers are representations of an image in different resolutions. The resolution is lower in the order of the third layer 36, the second layer 34, the first layer 32, and the 0-th layer 30.

For example, the resolution in the Nth layer (N is an integer equal to or greater than 0) may be ½ the resolution of the (N+1)th layer both in the horizontal (X axis) direction and in the vertical (Y axis) direction. In this case, the hierarchical data for each frame is generated by successively reducing the frame obtained as moving image data by half in the X-axis direction and the Y-axis direction.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. The data used for decoding may be designated with the coordinates of the four corners (frame coordinates) of a frame in the virtual space. A boundary for switching is defined between layers on the Z axis. When the Z coordinate of the frame goes beyond the boundary for switching, the layer subject to decoding is switched. By enlarging/reducing the decoded image as appropriate to match the resolution required for display, an image with desired resolution is obtained.

Instead of the frame coordinates in the virtual space, information identifying the layer and the texture coordinates (UV coordinates) in the layer may be derived. Hereinafter, the combination of the information identifying the layer and the texture coordinates will also be referred to as frame coordinates. In the example of FIG. 1, the entirety of a moving image is displayed in every screen. Alternatively, a portion of a moving image may be shown in an enlarged view by designating the data using frame coordinates.

Figure 4:
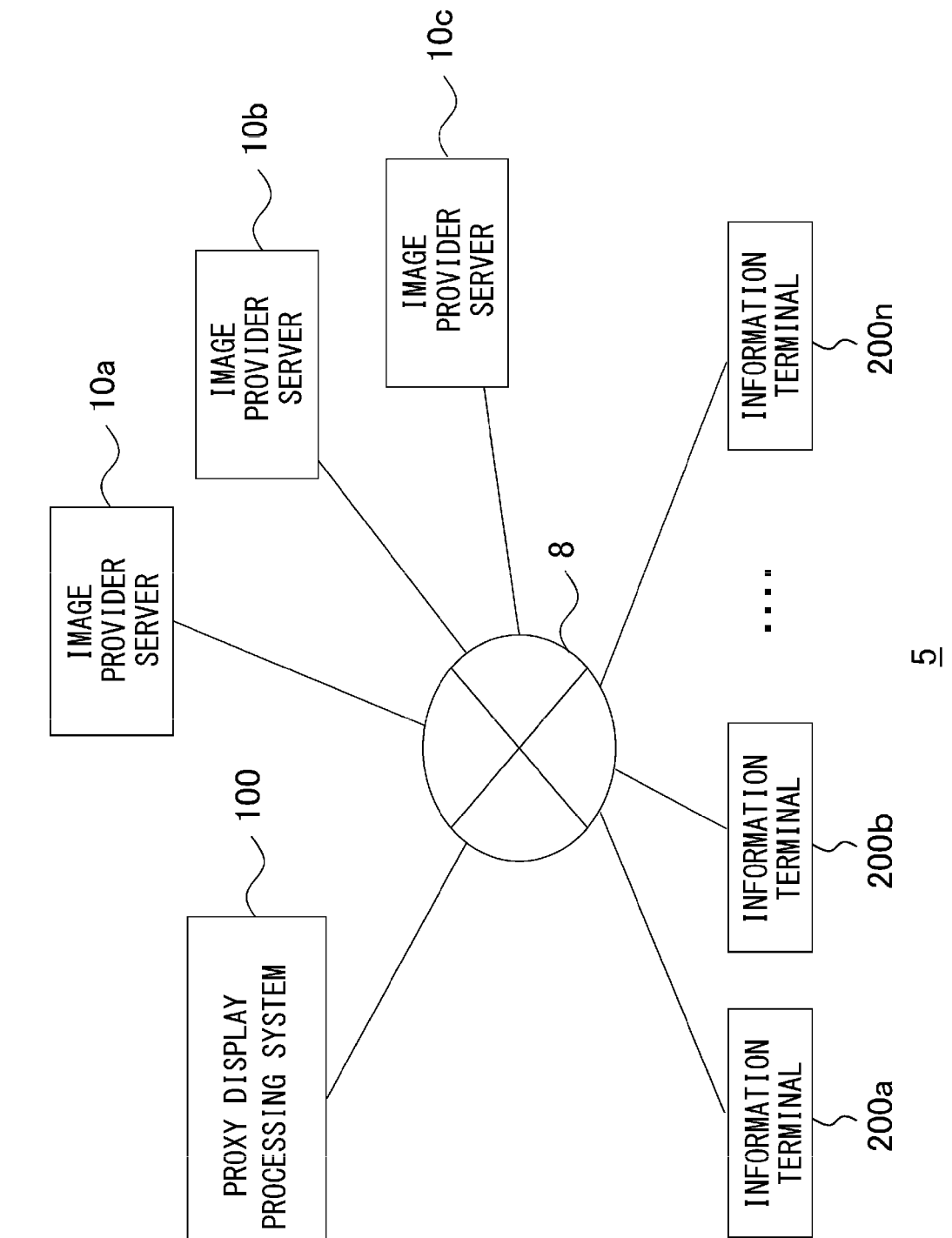
FIG. 4 shows an exemplary configuration of an image display system to which the embodiment can be applied.

FIG. 4 shows an exemplary configuration of an image display system to which the embodiment can be applied. An image processing system 5 is configured such that information terminals 200*a*, 200*b*, . . . , 200*n* are configured for connection to a network 8 such as the Internet. Further, image provider servers 10*a*, 10*b*, and 10*c* and a proxy display processing system 100 are connected to the network 8.

The information terminals 200*a*, 200*b*, . . . , 200*n* are devices adapted to acknowledge a user operation so as to display images, and may be embodied by common information processing devices such as personal computers, cell phones, tablet terminals, and game devices. The information terminals 200*a*, 200*b*, . . . , 200*n* according to the embodiment have the function of transmitting information on an acknowledged user operation to the proxy display processing system 100 and receiving and displaying data for a display screen transmitted from the proxy display processing system 100. The term "data for a display screen" represents data for an image having the screen size of the information terminals 200*a*, 200*b*, . . . , 20*n*, and is basically designed to be displayed without any modification. However, the data may be modified in the information terminal before being used for display.

The image provider servers 10*a*, 10*b*, and 10*c* provide image data pursuant to a request from other devices via the network 8. As described above, the image data may be supplied by downloading a file or by being delivered as a stream. The image data may be generated in advance. Alternatively, the image provider servers 10*a*, 10*b*, or 10*c* may provide image data being captured by the image provider server itself or by the other device on a real time basis. The number of image provider servers 10*a*, 10*b*, 10*c*, . . . is nonrestrictive.

The proxy display processing system 100 is a system that performs part of information processing on behalf of the information terminals 200*a*, 200*b*, . . . , 200*n*. For example, when the user provides the information terminal 200*a* with a request to start or end displaying images, to enlarge, reduce, or scroll the display screen, or to switch the screen, the proxy display processing system 100 accordingly generates data for a screen that should be displayed and transmits the generated data to the information terminal 200*a* originating the request. When the user requests viewing the image provided by the image provider server 10*a*, the proxy display processing system 100 receives the image data from the image provider server 10*a*, generates data for a display screen for showing the image, and transmits the generated data to the information terminal 200*a*.

The proxy display processing system 100 includes the function of decoding the image data received from the image provider server 10*a*, etc. in order to generate the data for the display screen. If it is attempted to effect a change in the screen as shown in FIG. 1, the problem associated with the amount of consumed resources, which could occur if conversion into hierarchical data is not introduced, would manifest itself. That is, in the event that requests to display a large number of moving images are originated at a time in the plurality of information terminals 200*a*, 200*b*, . . . , 200*n*, the amount of resources consumed in the proxy display processing system 100 will be increased in proportion to the number of information terminals.

In other words, the amount of consumed resources will fluctuate more drastically than the case when decoding proceeds in a single device. This is addressed by introducing the hierarchical data generation device 12 of FIG. 2 in the proxy display processing system 100. This ensures that the amount of resources consumed for data transfer or decoding performed inside the proxy display processing system 100 will be commensurate with the total of screen sizes provided in the information terminals 200*a*, 200*b*, . . . , 200*n*, regardless of the display content. As a result, estimation of resource requirements is facilitated. As a result, various requests from the information terminals 200*a*, 200*b*, . . . , 200*n* can be addressed in a stable fashion without enhancing the processing performance of the proxy display processing system 100 more than is necessary.

Figure 5:
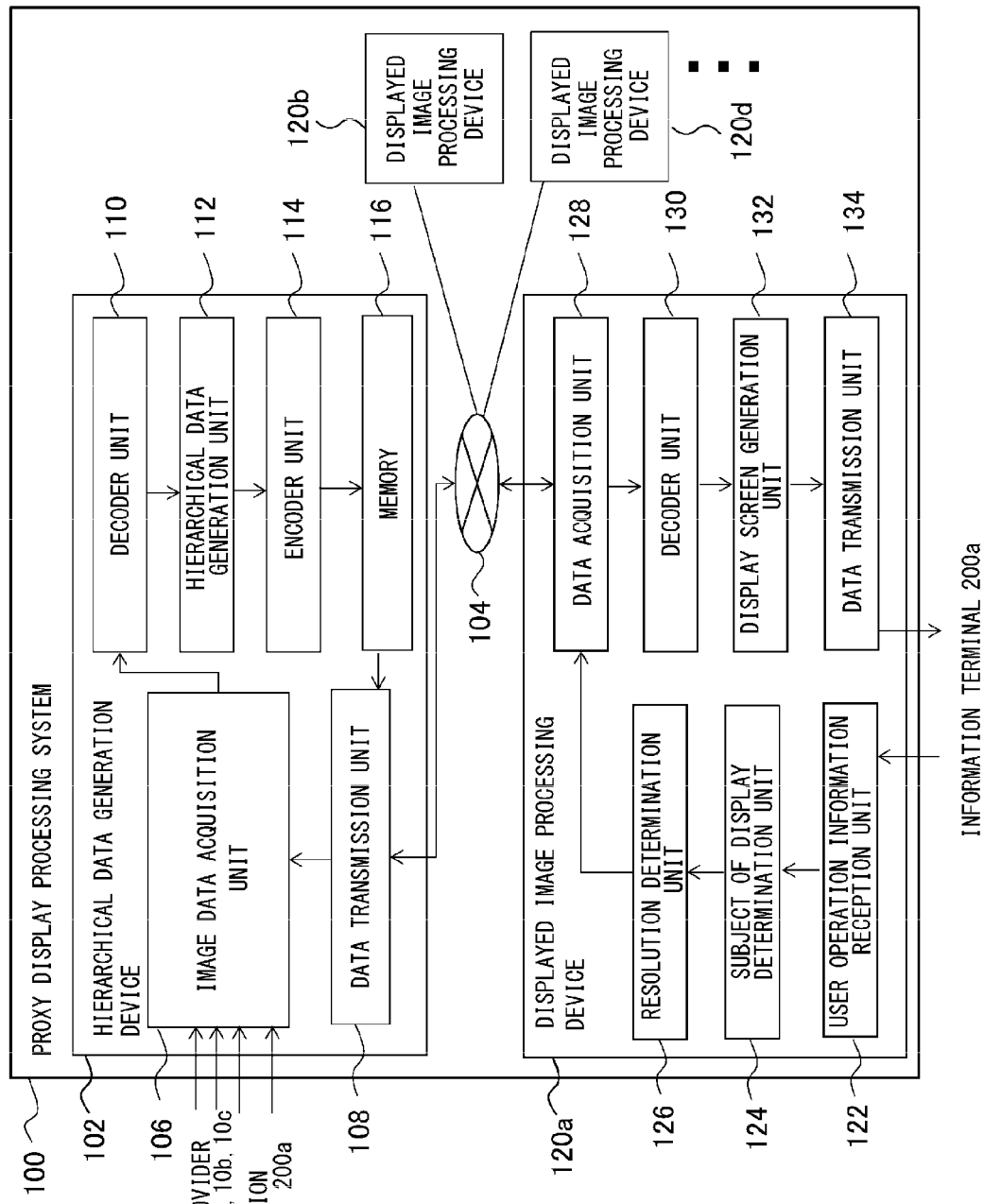
FIG. 5 shows the configuration of the proxy display processing system in detail.

FIG. 5 shows the configuration of the proxy display processing system 100 in detail. The proxy display processing system 100 is configured such that a hierarchical data generation device 102, which is equivalent the hierarchical data generation device 12 of FIG. 2, and displayed image processing devices 120*a*, 120*b*, 120*c*, . . . , which include the function of the decoder 14 of FIG. 2, are connected to each other via a network 104 such as a local area network (LAN).

Figure 6:
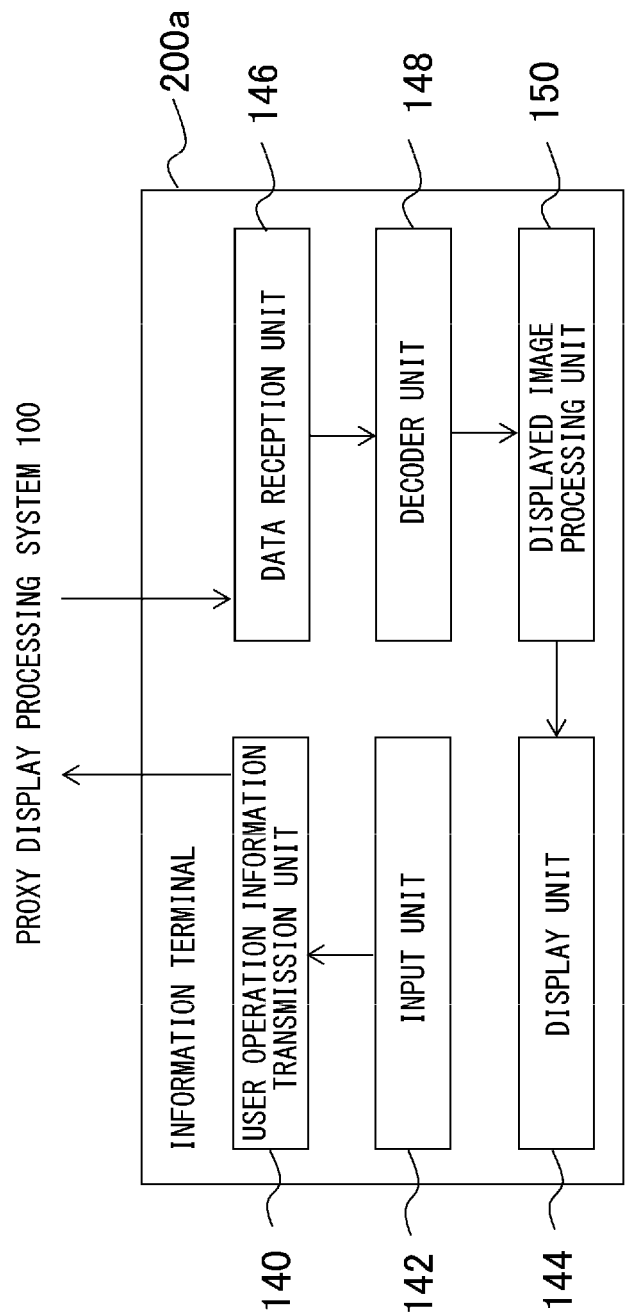
FIG. 6 shows the configuration of the information terminal in detail.
Figure 9:
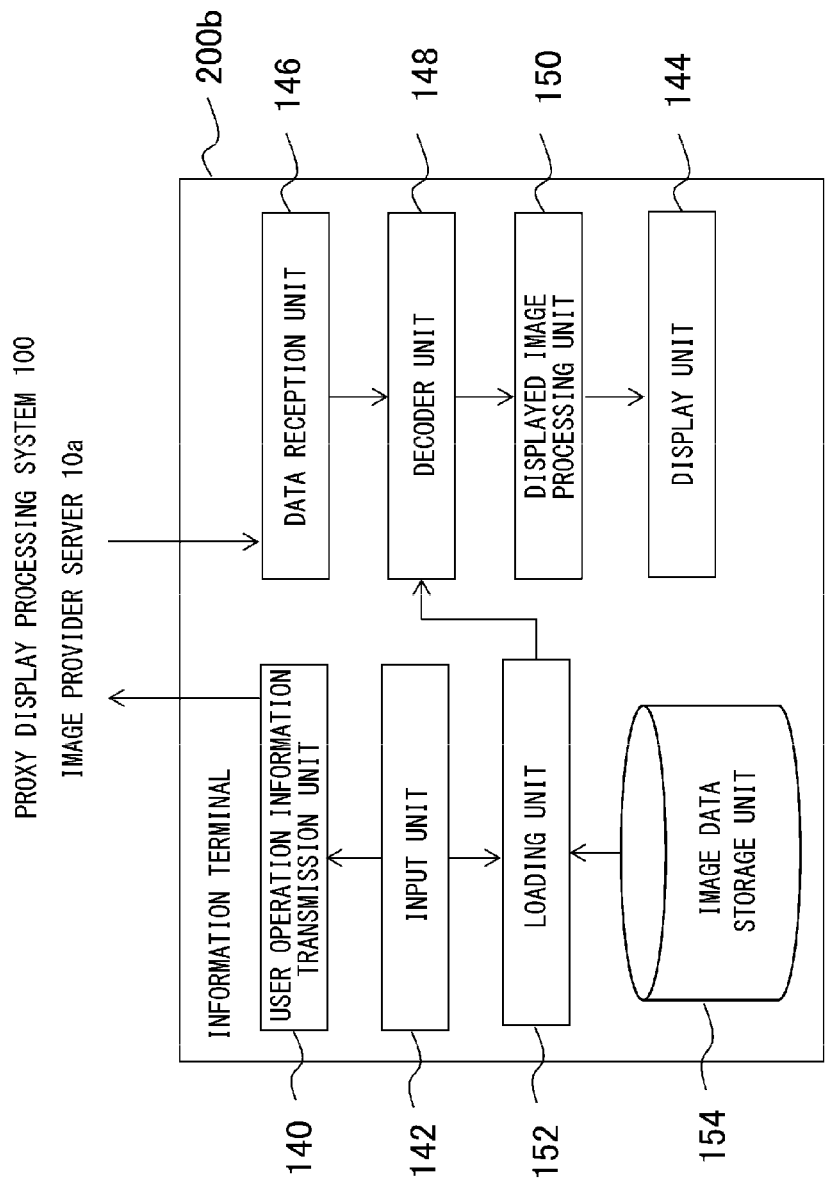
FIG. 9 shows the details of the configuration of the information terminal for implementing the embodiment whereby the data for concurrently displayed moving images is acquired from a plurality of sources of supply.

The elements depicted in FIGS. 5, 6, and 9 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof.

Basically, the displayed image processing device 120a has the function of receiving information on a user operation from, for example, the information terminal 200a and transmitting data of a display screen. Processes performed by the displayed image processing device 120a in response to a user operation may not only include a process for displaying images but also ordinary information processing such as that for games and calculation. The description here highlights the process for generating the display screen as shown in FIG. 1. As shown in FIG. 5, a plurality of displayed image processing devices 120a, 120b, 120c, . . . may be connected to the hierarchical data generation device 102 in the proxy display processing system 100 via the network 104 and exchange data with mutually different information terminals.

The displayed image processing device 120a includes a user operation information reception unit 122 for receiving information on a user operation performed in the information terminal 200a, a subject of display determination unit 124 for identifying a moving image that should be displayed, a resolution determination unit 126 for determining the display resolution of the moving image, a data acquisition unit 128 for acquiring compressed data for a layer, included in the hierarchical data of the moving images subject to display, that corresponds to the display resolution, a decoder unit 130 for decoding the compressed data, a display screen generation unit 132 for locating the decoded image in an image area representing the screen and generating data for a display screen, and a data transmission unit 134 for transmitting the data for the display screen to the information terminal 200a.

The user operation information reception unit 122 receives information on a user operation performed in the information terminal 200a. As mentioned above, the user operation information may indicate start or end of displaying of images, or enlargement, reduction, or scroll of the screen. The user operation information may further include designation of the image provider server 10a, designation of the moving image desired to be displayed, or designation of the type of moving image. For example, in response to a request from the information terminal 200a, the displayed image processing device 120a transmits data for an image for a web site of an image provider server (e.g. the image provider server 10a) to the information terminal 200a to build a display screen.

The user operation information reception unit 122 then acquires input information designating one moving image from a list of the names of moving images displayed in the web site. Alternatively, the user operation information reception unit 122 acquires information on a search key entered in the web site. The user operation information reception unit 122 further acquires information related to the screen size of the display device provided in the information terminal 200a upon connection. The subject of display determination unit 124 identifies a moving image that should be displayed by referring to the information on a user operation.

When the user requests a change in the display area showing an array of moving images as shown in FIG. 1, the subject of display determination unit 124 identifies the frame coordinates of the display area in a pre-generated virtual image that maps the array of displayed moving images and their positions of display on the screen, by referring to the information on a user operation, and identifies moving images included in the display area. If the moving images in the array should represent a search result corresponding to a search key entered by the user, two steps will be required. More specifically, the search key received by the user operation information reception unit 122 is forwarded to the image provider server 10a to receive a list of moving images that represent a search result. The arrangement of the moving images is then determined and moving images included in the display area are identified. If the user selects a specific moving image, the selected moving image is determined to be displayed in due course.

The resolution determination unit 126 determines the display resolution of the moving image in accordance with the relative size of the moving image with respect to the screen in which the moving image subject to display is located and with the screen size of the display device of the information terminal 200a. The resolution determination 126 further determines an area in the moving image that should be displayed. By introducing the use of frame coordinates, the resolution and the display area can be designated equally when the entirety of the moving image is displayed and when a part thereof is displayed. The resolution determination unit 126 delivers a data set comprising identification information of the moving image subject to display and the frame coordinates of the display area to the data acquisition unit 128.

The data acquisition unit 128 refers to the information delivered from the resolution determination unit 126 and acquires the relevant compressed data from the hierarchical data generation device 102. The decoder unit 130 decodes the compressed data thus acquired. If a stream of moving image data is transmitted, the decoder unit 130 decodes the data acquired by the data acquisition unit 128 in the order of acquisition.

The displayed screen generation unit 132 determines the position of the moving image subject to display in the screen and uses the decoded data to generate the data for the display screen showing frames of moving images at respective positions. Since the subject of display is a moving images, the display screen generation unit 132 generates data for new display screens according to a timing schedule determined by the frame rate. The data transmission unit 134 successively encodes the data for display screens thus generated in a predetermined scheme and transmits the encoded data to the information terminal 200a.

The hierarchical data generation device 102 includes a data transmission unit 108 for acknowledging a request from the displayed image processing device 120a and transmitting data accordingly, an image data acquisition unit 106 for acquiring moving image data from, for example, the image provider server 10a, a decoder unit 110 for decoding the acquired moving image data, a hierarchical data generation unit 112 for generating hierarchical data for each frame, an encoder unit 114 for encoding the hierarchical data, and a memory 116 for storing the encoded hierarchical data.

The image data acquisition unit 106 acquires identification information on the moving image designated by the displayed image processing device 120a from the data transmission unit 108, and accordingly receives the moving image data subject to display from the image provider server 10a, 10b, or 10c. The moving image data may be encoded in an ordinary scheme. The moving image data which is received in the past and for which the hierarchical data is stored in the memory 116 need not be received from scratch. As shown in FIG. 5, the image data acquisition unit 106 may acquire moving image data from the information terminal 200a itself. In this case, hierarchical data is generated from the moving image data stored in the information terminal 200a and is used, like other moving images, to build a list displayed in the screen.

The decoder unit 110 decodes the moving image data acquired by the image data acquisition unit 106. The hierarchical data generation unit 112 generates hierarchical data by reducing each frame in the moving image comprising a decoded series of frames to a predetermined resolution, and interrelating the images in the order of resolution for each frame. This generates a series of hierarchical data for the moving image subject to display. Where there are a plurality of moving images subject to display, a series of hierarchical data is generated similarly for each moving images. The encoder unit 114 encodes the series of hierarchical data. The scheme of encoding is determined in advance in accordance with the resource environment within the proxy display processing system 100 (transfer bandwidth available in the network 104, processing capabilities of the decoder unit 130 of the displayed image processing device 120*a*, etc.).

In order to reduce variation in the amount of consumed resources responsive to increase or decrease in the number of concurrently displayed moving images, it is desirable to employ a scheme capable of reading only a necessary area in a necessary layer in a compressed state. Another consideration is that a scheme with higher compression rate normally requires heavier load for encoding and decoding. In an environment in which sufficient transfer rate on the network 104 is guaranteed, it is desirable to increase the throughput of data transmission to the information terminal 200*a* by reducing the load for encoding and decoding, at the cost of decreasing the compression rate to a degree.

In light of these considerations, a compression method capable of quantizing pixel values in units of data blocks, which are produced by dividing a frame of a moving image into image blocks of predetermined sizes and collecting resultant image blocks from a predetermined number of frames. S3 Texture Compression (S3TC) would be suitable in the case of still images. These schemes do not require, for the purpose of decoding a necessary area, loading data for areas outside the necessary area into the memory, and so are characterized by absence of extra decoding processing and less memory consumption.

Meanwhile, if the encoder unit 114 and the decoder unit 130 are provided with more than enough processing capabilities, Advanced Video Coding (AVC) or Scalable Video Coding (SVC) characterized by high compression rate would be suitable for moving images. In the case still images, Joint Photographic Experts Group (JPEG) would be suitable. Alternatively, hierarchical data may be generated by using a plurality of encoding schemes so that the hierarchical data is adaptively selected in accordance with the situation of use of resources in the network 104 or in the displayed image processing device 120*a*.

The encoder unit 114 stores the encoded series of hierarchical data in the memory 116, mapping the series of hierarchical data to the identification information for the moving image. Because each item of hierarchical data corresponds to each frame of the source moving image, the hierarchical data is mapped to the frame number. For example, the memory 116 is a random access memory (RAM) and stores the encoded hierarchical data series. The series of hierarchical data for the moving image previously displayed in the information terminal 200*a* or the series of hierarchical data for the moving image previously displayed in other information terminals may be stored in the memory 116 at least for a predetermined period of time.

This ensure that only the moving image for which the hierarchical data is not stored in the memory 116 should be decoded by the decoder unit 110 of the hierarchical data generation device 102 from scratch. If a stream of moving image data is transferred from, for example, the image provider server 10*a*, frames continue to be converted into hierarchical data as they arrive and stored in the memory 116. This also allows a plurality of information terminals concurrently displaying the same moving image to share the data and so helps reduce the processing load as compared with the case where the moving image is individually decoded for the respective information terminals.

The data transmission unit 108 communicates the identification information on the moving image requested by the displayed image processing device 120*a* to the image data acquisition unit 106. Of the series of hierarchical data stored in the memory 116, the compressed data for the layer, included in the moving image subject to display, that corresponds to the display resolution is read by the data transmission unit 108 and transmitted to the displayed image processing device 120*a* via the network 104. By providing a boundary for switching in the direction of resolution of hierarchical data as described above, the layer corresponding to the display resolution is uniquely identified.

FIG. 6 shows the configuration of the information terminal 200*a* in detail. The information terminals 200*b*, . . . , 200*n* may also have the same configuration. The information terminal 200*a* may be provided with the function of executing processes that do not involve transmission and reception of data to and from the proxy display processing system 100. For example, the information terminal 200*a* may be provided with the function for various types of information processing or communication. Ordinary technology can be used to implement such functions, depending on the type of device embodying the information terminal 200*a*. Therefore, illustration of the associated functional blocks is omitted.

The information terminal 200*a* is provided with an input unit 142 that allows the user to control the information terminal 200*a*, a user operation information transmission unit 140 for transmitting information on a user operation to the proxy display processing system 100, a data reception unit 146 for receiving data for a display screen from the proxy display processing system 100, a decoder unit 148 for decoding the data for the display screen, a displayed image processing unit 150 for rendering the display screen using the decoded data, and a display unit 144 for displaying the display screen.

The input unit 142 acknowledges a user operation provided by the user viewing the screen displayed on the display unit 144. For example, the input unit 142 acknowledges a user operation to select a file or a command, a user operation to switch the display screen, or a user operation to enlarge, reduce, or scroll the screen. The input unit 142 communicates the user operation to the user operation information transmission unit 140. The input unit 142 is implemented by an ordinary input device such as a pointing device, a mouse, a keyboard, a touch panel, a game controller, or a button.

The user operation information transmission unit 140 transmits the information on a user operation communicated from the input unit 142 to the proxy display processing system 100. The user operation information transmission unit 140 may transmit the unmodified version of the signal generated by the input unit 142 in response to a user operation. Alternatively, the user operation information transmission unit 140 may interpret the signal according to a predetermined algorithm and generate and transmit a signal that contains only necessary information. Whether the former mode or the latter mode is employed may be determined as appropriate depending on the details of processing that the proxy display processing system 100 performs on behalf of the information terminals.

The data reception unit 146 successively receives the compressed data for the display screen from the proxy display processing system 100. The display screen changes according to the result of processing in the proxy display processing system 100 performed in response to a user operation. The display screen also changes with the progress of moving image being played back. The decoder unit 148 decodes the compressed data for the display screen and loads the decoded data in a buffer memory (not shown). The displayed image processing unit 150 converts the data for the display screen thus loaded into a video signal to be output to the display unit 144. The display unit 144 presents the display screen by outputting the video signal. The display unit 144 may be any common display such as a liquid crystal display, an electronic luminescence (EL) display, and a plasma display.

Figure 7:
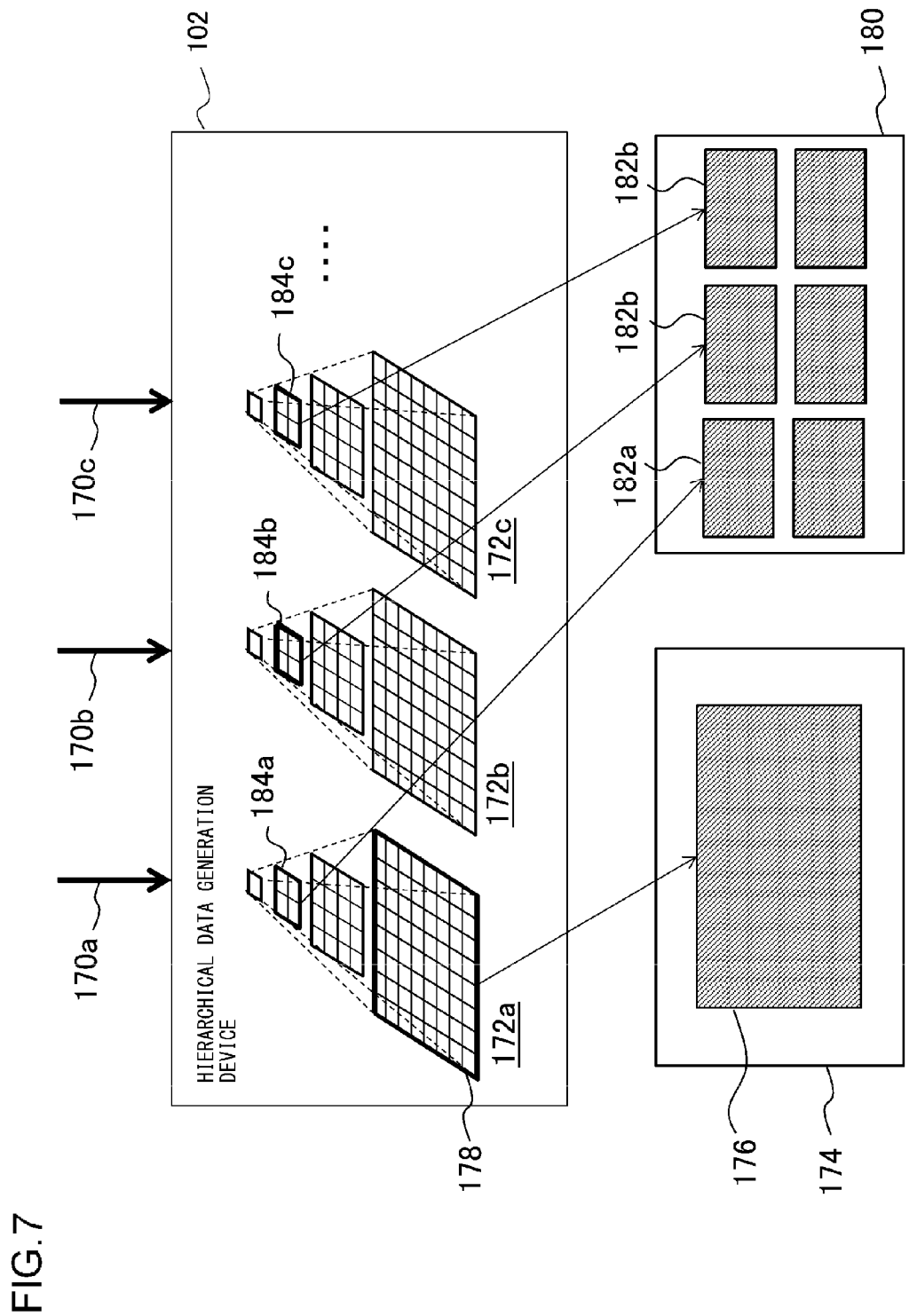
FIG. 7 schematically shows mapping between layers in the hierarchical data subject to decoding to display screens.

FIG. 7 schematically shows mapping between layers in the hierarchical data subject to decoding to display screens. A plurality of items of moving image data 170a, 170b, 170c, ... are input to the hierarchical data generation device 102 from, for example, the image provider server 10a. The hierarchical data generation device 102 converts the input data into hierarchical data frame by frame. In the illustration, the hierarchical data for one frame from the moving image data 170a, 170b, and 170c is symbolically represented by the hierarchical data 172a, 172b, and 172c, respectively.

If the user selects only the moving image data 170a, the resolution determination unit 126 of the displayed image processing device 120a defines a moving image display area 176 for displaying a single moving image within a screen area 174. Information on moving image display area 176 may be predefined for the purpose of displaying a single moving image. Alternatively, the information may be acquired as a result of the user zooming into a single image while images from a plurality of moving images in an array are being displayed. The resolution determination unit 126 determines the display resolution in accordance with the screen size of the display unit 144 of the information terminal 200a and with the relative size of the moving image display area 176 in the screen area 174. The layer subject to decoding is selected from the hierarchical data 172a of the moving image data 170a in accordance with the determined resolution. In the illustrated example, a third layer 178 is selected.

If the user switches to the screen showing an array of a plurality of moving images, or reduces the screen while one of the moving images in the array is being displayed in an enlarged view, the subject of display determination unit 124 identifies a plurality of moving images subject to display. In the illustrated example, 6 moving images are identified. Similarly as above, the resolution determination unit 126 defines moving image display areas (e.g., areas 182a, 182b, and 182c) for displaying 6 moving images within a screen area 180 with the result that layers subject to decoding are selected from the hierarchical data 172a, 172b, 172c, . . . for the moving image data 170a, 170b, 170c, . . . . In the illustrated example, first layers 184a, 184b, and 184c are selected.

In the example of FIG. 7, it is assumed that moving images are displayed in full view so that the data for full view of the selected layer is selected as a subject of decoding. Alternatively, where it is possible to access compressed data for individual areas (e.g. individual tile images within the layer), only a partial area within the layer may be subject to decoding. In the illustrated example, moving images that are concurrently displayed are of the same size. Alternatively, the sizes of the moving images concurrently displayed may vary from image to image, depending on the design of the display screen. In this case, the layer subject to decoding may differ from one image to another.

Figure 8:
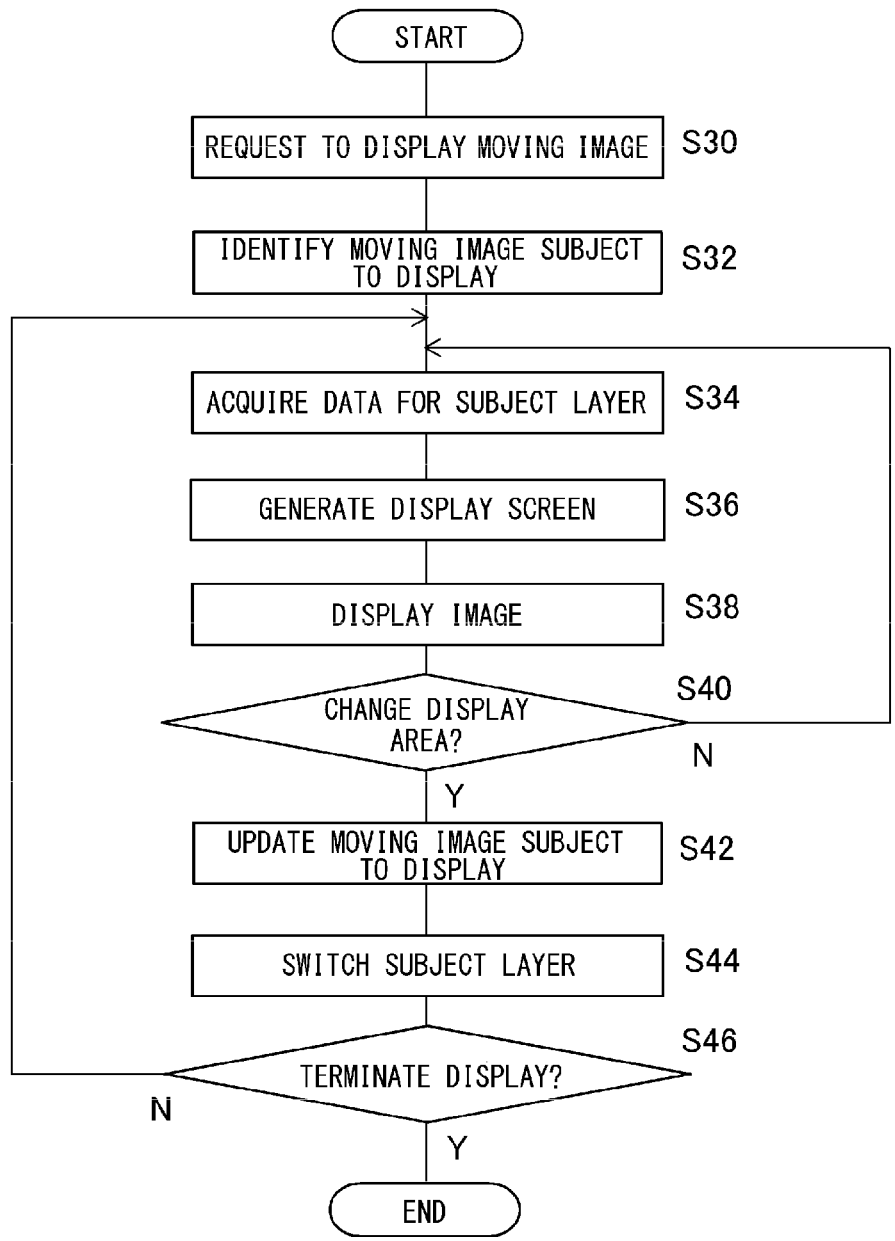
FIG. 8 is a flowchart of the steps of image processing according to the embodiment.

A description will now be given of the operation of the image processing system implemented by the configuration described so far. FIG. 8 is a flowchart of the steps of image processing primarily performed by the information terminal 200a and the proxy display processing system 100 in the image processing system 5 of FIG. 4. Initially, the user provides a request to display a moving image in the information terminal 200a (S30). For example, display of a thumbnail of a moving image belonging to some category may be requested. Alternatively, the user may enter a search key as mentioned above.

In response, the displayed image processing device 120a in the proxy display processing system 100 identifies a moving image(s) subject to display by referring to the user operation (S32). The displayed image processing device 120a determines the display resolution of the moving images by referring to the number of moving images to be displayed and so on, and acquires compressed data for the layer subject to decoding from the hierarchical data generation device 102 accordingly (S34). It will be assumed that, between S32 and S34, the hierarchical data generation device 102 has acquired moving images subject to display determined in S32 from, for example, the image provider server and generated the hierarchical data if needed.

The data for a display screen is generated by decoding the acquired compressed data and locating decoded frames and the background in an area representing the screen (S36). Upon acquiring the compressed data for the display screen, the information terminal 200a decodes the compressed data and displays the display screen accordingly (S38). While the user does not request changing the display area (N in S40), the hierarchical data corresponding to subsequent frames of the same moving image will be used to collect necessary data so as to generate the display screen and continue to display the moving image (S34-S38).

Meanwhile, once the display area is changed as a result of, for example, a user operation to switch the screen, or to enlarge, reduce, or scroll the screen showing the array of moving images (Y in S40), the displayed image processing device 120a updates the moving image subject to display by identifying moving images included in the new display area (S42). If the display resolution is changed as a result of, for example, change in the number of moving images to be displayed, the layer subject to decoding is switched as necessary (S44).

Of the hierarchical data of the moving image newly identified as being subject to display, the layer subject to decoding is decoded, and the display screen is generated and displayed accordingly (S34-S38). The aforementioned steps are repeated until a user operation to end the display is performed in the information terminal 200a (N in S46, S34-S44). When a user operation to end the display is performed, the process is terminated (Y in S46).

According to the configuration described above, the data for the display screen generated by the proxy display processing system 100 is decoded and used for display unmodified in the information terminal 200a. Alternatively, the display screen generated by the proxy display processing system 100 and the image stored in the information terminal 200a may be concurrently displayed. Still alternatively, some of the moving images may be directly received from, for example, the image provider server 10a and displayed concurrently. FIG. 9 shows the details of the configuration of the information terminal for implementing the embodiment whereby the data for concurrently displayed moving images is acquired from a plurality of sources of supply.

Functionally, the input unit 142, the user operation information transmission unit 140, the data reception unit 146, the decoder unit 148, the displayed image processing unit 150, and the display unit 144 of the information terminal 200b are substantially similar to the corresponding units in the information terminals 200a shown in FIG. 6 and so are represented by like numerals. The information terminal 200b is further provided with an image data storage 154 for storing image data such as moving images, and a loading unit 152 for loading moving image data subject to display in response to a user operation.

The image data storage 154 comprises a hard disk drive. Alternatively, the image data storage 154 may be embodied by a removable recording medium such as a memory card and a compatible reader, or a read-only ROM disk and a compatible drive device. Data other than the image data stored in the image data storage 154 may be used. For example, data for a moving image being captured by a camera (not shown) provided in the information terminal 200b may be used.

The image data stored in the image data storage 154 may be hierarchical data or data for a moving image or a still image comprising a single resolution. By storing hierarchical data, variation in consumption of resources in the decoder unit 148 and the internal bus can be reduced for the same reason that warrants generation of hierarchical data in the proxy display processing system 100. The loading unit 152 verifies whether the moving image designated by a user operation as being subject to display includes image data stored in the image data storage 154. If it is included, the loading unit 152 reads the data and supplies the data to the decoder unit 148. If the image data is hierarchical, the loading unit calculates the display resolution and selects the layer to be loaded.

In this embodiment, the image that should be stored in the image data storage 154 and the image that should be acquired from an external source may be determined in accordance with the type of image, and a determination may be made as to which image should be displayed in response to the content of user operation. For example, images representative of an enormous amount of options or images highly likely to be updated may be acquired from an external source. Images representative of a limited amount of options or images characterized by small changes may be stored in the image data storage unit 154. Taking images of a shopping catalog as examples, images for selection of a product category are less frequently updated so that the associated data is stored in the image data storage unit 154. Conversely, images of individual products, images showing associated information, or images of related products need be constantly updated and so are acquired from an external source each time the image is displayed.

The user operation information transmission unit 140 determines, for each moving image of which data should be acquired from an external source, whether to acquire the moving image data from the proxy display processing system 100 or directly acquire the data from the image provider server 10a, according to a predefined rule. The moving image data directly acquired from the image provider server 10a includes more than enough information that is necessary to display images in a reduced view. Therefore, the larger the scale of reduction, the more wastefully the resources for data transfer and decoding will be used.

In light of this fact, the volume of moving image data directly acquired from the image provider server 10a may be reduced as the display resolution is reduced. Alternatively, the availability of transfer bandwidth may be monitored on a real time basis so that directly acquired moving image data is reduced depending on the aggravation of the situation. The user operation information transmission unit 140 transmits information on the content of user operation to the proxy display processing system 100 and transmits information designating the moving image determined to be directly acquired to the image provider server 10a so as to request transmission of the image data.

In this case, the proxy display processing system 100 generates data for a display screen, leaving the area for displaying the moving image acquired by the information terminal 200b from an alternative source. Information on the area may be designated by the information terminal 200b. Alternatively, a certain rule for determination may be defined and shared by the proxy display processing system 100 and the information terminal 200b. In case the moving image acquired from the image provider server 10a is changed depending on a change in the situation, the information terminal 200b may similarly notify the proxy display processing system 100. Alternatively, a rule for such change that should be shared may be defined. The data reception unit 146 receives the requested image data from the proxy display processing system 100, the image provider server 10a, etc.

The decoder unit 148 decodes the image data received by the data reception unit 146 from an external source and the image data loaded by the loading unit 152 and stored internally. The displayed image processing unit 150 superimposes the image transmitted from the image provider server 10a or the image loaded by the loading unit 152 on the background of the display screen generated by, for example, the proxy display processing system 100. With this, moving images or still images originating from different sources can be concurrently arranged and displayed in the same screen of the display unit 144. moving images concurrently shown may be supplied from 2 types of sources selected from the 3 types described above. Alternatively, selection may be made from 1-3 types depending on the content of display or the situation of network.

According to the configuration as described above, a large number of moving images and still images can be displayed at a time such that the amount of consumed resources is maintained within a certain range. However, the processing speed may be reduced depending on the situation of transfer bandwidth or the number of information terminals connected to the proxy display processing system 100. In this regard, the content of processing in the proxy display processing system 100 may be adjusted in accordance with, for example, the number of images concurrently displayed in the information terminal so that the overall consumption of resources is reduced and disadvantages such as dropped frames are less likely to occur regardless of the situation.

For example, if the number of concurrently displayed moving images is equal to or more than a threshold value, or if the display resolution is equal to or less than a threshold value, frames from moving images outside a certain range from the screen's center or from the moving image being selected by the user (e.g., moving image where the cursor is located) may be selectively discarded at a certain rate and the resultant moving image is shown frame by frame. The larger the distance from the screen's center or the selected moving image, the larger the number of frames that may be discarded. In this case, the subject of display determination unit 124 determines the amount of frame discarded in each moving image, depending on the location of the moving image. The data acquisition unit 128 acquires data for frames not discarded.

The decoder unit 130 and the display screen generation unit 132 refer to the amount of frames discarded and change the interval of decoding the moving image data and the interval of updating frames in the screen, depending on the moving image. This causes moving images of interest to the user to be displayed at a high time resolution and causes moving images away from the point of view to be displayed at a lower time resolution. Similarly, the resolution of moving images remote from the point of view may be reduced. This does not substantially harm the purpose of monitoring a plurality of moving images at a glance and saves the amount of consumed resources. When the moving image data for the entire frames has been acquired by the data acquisition unit 128, instead of processing a stream of a moving image successively, the speed of playback may be increased without changing the frame rate, by discarded selected frames.

The speed of playing back the entire moving images may be changed depending on the number of moving images displayed. For example, if the number of concurrently displayed moving images is equal to or more than a threshold value, or if the display resolution is equal to or less than a threshold value, the moving images are fast forwarded so that the entirety of the moving images can be monitored quickly. If the number of moving images is less than a threshold value, and if the original resolution of the moving image is substantially equal to the display resolution, the moving image may be played back at a normal speed. Further the playback speed may be decreased to lower than normal to display images in an enlarged view.

The number of concurrently displayed moving images is considered to represent the level of user attention to individual moving image. Therefore, if the number of concurrently displayed moving images is large and it is estimated accordingly that the user wishes to gain an overview, the user is given an opportunity to gain an overview in the temporal direction, too. Meanwhile, if a moving image is enlarged, it is estimated that the user wishes to monitor the moving image in detail so that the user is given an opportunity to monitor the moving image more easily by playing back the moving image in slow motion.

Adjustment of the speed of playback can be achieved by varying the processing rate of image generation performed by the display screen generation unit 132 and data transmission from the data transmission unit 134 to the information terminal 200a.

The content of moving image itself may be changed depending on the number of moving images. For example, the hierarchical data generation device 102 in the proxy display processing system 100 may acquire a full version and a promotion version of a movie from the image provider server 10a. The hierarchical data generation unit 112 may generate hierarchical data which includes a frame of the full version in high-resolution layers and a frame of the promotion version in low-resolution layers by reducing the frame. In this case, the hierarchical data generation unit 112 may produce such hierarchical data only for frames that occur early in the full version of the movie. Alternatively the promotion movie may be repeated in the low-resolution layer.

Such hierarchical data may similarly be processed as described above. In this mode of display, a promotion movie is displayed while the movies are shown in thumbnails. As a given movie is enlarged, the full version will be shown. This mode need not necessarily be achieved by a movie and the promotion movie. A similar mode of display can be achieved given a moving image and a simplified version created in association.

According to the embodiment described above, input data for still images or moving images are converted into hierarchical data representing the original images in a plurality of resolutions at a point of time prior to decoding. The layer subject to decoding is switched depending on the resolution required for display. In this way, variation in the size of data subject to processing responsive to a shift from a state in which a single still image or a single moving image is shown to a state in which a plurality of still images or a plurality of moving images are shown is mitigated. As a result, this ensures constant processing resources consumed for decoding or constant data transfer bandwidth consumed before decoding.

The above-described benefit will be exhibited significantly in systems where the number of moving images changes considerably depending on the intent of a plurality of users, such as the proxy display processing system configured to acknowledge requests from a plurality of information terminals and generate a display screen on behalf by acquiring image data and decoding the data. In further accordance with the embodiment, the level of user attention to the moving images is estimated by referring to the number of concurrently displayed moving images so that frames are discarded at intervals or the playback speed is changed accordingly. In this way, resource consumption can be reduced in a manner that the user's purpose of displaying a moving image remains served. As a result, the likelihood of delay in the display is reduced and a large number of images can be displayed concurrently and responsively, even in the presence of a change in the availability of transfer bandwidth or in the situation of user operation.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The above description of the embodiment assumes that the hierarchical data generation device is provided in the proxy display processing system 100. Since the proxy display processing system 100 acknowledges requests from a plurality of information terminals, the likelihood that the hierarchical data for a given moving image was generated in the past is high. Therefore, decoding processes for generating hierarchical data in the hierarchical data generation device can be distributed easily. As a result, the advantage of constant resource consumption produced by switching the layer subject to decoding in the displayed image processing device 120a will be readily appreciated.

The hierarchical data generation device may be provided in the information terminal in an environment where the proxy display processing system 100 is not introduced. By distributing hierarchical data generation processing performed by the hierarchical data generation device over time, it is ensured, as in the embodiment, that the amount of resources required to process data to display images remains almost constant irrespective of the number of moving images so that the display speed is prevented from being lowered. In this case, the information terminal would include the hierarchical data generation device 12, the decoder 14, and the display device 16 shown in FIG. 2 Changes in the screen and adjustment of processing details can be achieved similarly as the embodiment.

What is claimed is:

1. An image processing system comprising an information terminal configured to display an image array in response to a user operation, and a server connected to the information terminal via a network and configured to transmit image array data to the information terminal, the information terminal comprising:

a user operation information transmission unit configured to receive user operation input for requesting a change in a size of one or more images in the image array subject to display and to transmit information related to the user operation input to the server; and a displayed image processing unit configured to display the image array by using data for a display screen that is transmitted from the server in response to the user operation input and in which a size of the one or more images in the image array subject to display is changed, the server comprising:

a hierarchical data generation device configured to generate hierarchical data representing each of the images in the image array subject to display in a plurality of resolutions and hierarchized in the order of resolution; and a displayed image processing device which comprises:

a decoder unit configured to switch and decode one or more layers in the hierarchical data subject to decoding process in accordance with a change in a display resolution of the one or more images in the image array subject to display in the information terminal, the change being indicated by the user operation input transmitted from the information terminal;

a display screen generation unit configured to generate the data for the display screen including the decoded one or more images in the image array subject to display; and a data transmission unit configured to transmit the data for the display screen to the information terminal.

2. The image processing system according to claim 1, wherein the information terminal further comprises a data reception unit configured to receive image data from an image provider server via a network, and wherein the displayed image processing unit of the information terminal includes, in a display screen the data for which is transmitted from the server, an image produced by decoding said image data, and presents a resultant display screen as an ultimate display screen.

3. The image processing system according to claim 2, wherein the displayed image processing unit further includes, in the display screen, an image produced by decoding image data stored in a storage in the information terminal.

4. The image processing system according to claim 2, wherein the information terminal changes a source of supply of data for an image included in a display screen, depending on information on availability of bandwidth for transfer of image data.

5. The image processing system according to claim 1, wherein the hierarchical data generation device generates hierarchical data for images subject to display in a plurality of information terminals in a centralized manner, and transmits, to each of a plurality of displayed image processing devices comprised in the server, data for a layer subject to decoding by the decoder unit in each of the plurality of displayed image processing devices.

6. The image processing system according to claim 1, wherein the user operation information transmission unit of the information terminal acknowledges the user operation input requesting a change in the number of concurrently displayed images, and the display screen generation unit of the server generates the data for a display screen including a plurality of images subject to display decoded by the decoder unit.

7. The image processing system according to claim 1, wherein the hierarchical data generation device of the server generates items of the hierarchical data, each of which represents each frame in a moving image subject to display, and wherein the data transmission unit successively transmits the data for a display screen including the each frame generated by the display screen generation unit to the information terminal.

8. The image processing system according to claim 7, wherein the display screen generation unit increases, if a display resolution of a moving image subject to display is less than or equal to a threshold value, a speed of playing back the moving image without changing a rate of generating the data for a display screen, by discarding frames subject to generation at predetermined intervals.

9. The image processing system according to claim 7, wherein if the display resolution is less than or equal to a threshold value as a result of an increase in the number of concurrently displayed moving images, the display screen generation unit discards frames of a moving image outside a predetermined range from the screen's center or from a moving image selected by a user at predetermined intervals, and generates the data for a display screen accordingly.

10. The image processing system according to claim 7, wherein the hierarchical data generation device generates hierarchical data including a layer of an image representing frames of a moving image in the original resolution and a layer of an image representing another moving image produced in association with said moving image in a resolution smaller than the original resolution.

11. An image provider server comprising:

a user operation information reception unit configured to receive information related to user operation input requesting a change in a size of one or more images in an image array subject to display from an information terminal connected via a network;

a hierarchical data generation unit configured to generate hierarchical data representing each of the images in the image array subject to display in a plurality of resolutions and hierarchized in the order of resolution;

a decoder unit configured to switch and decode one or more layers in the hierarchical data subject to decoding process in accordance with a change in a display resolution of the one or more images in the image array subject to display in the information terminal, the change being indicated by the information related to user operation input;

a display screen generation unit configured to generate data for a display screen including the decoded one or more images in the image array subject to display; and a data transmission unit configured to transmit the data for the display screen to the information terminal so as to display the display screen in which a size of the one or more images in the image array subject to display is changed.

12. An information processing device comprising:

a hierarchical data generation unit configured to generate hierarchical data representing, for each of one or more moving images in an image array, each frame of the moving image in a plurality of resolutions and hierarchized in the order of resolution;

an input unit configured to acknowledge user operation input requesting a change in the number of concurrently displayed one or more images in the image array while one or more images in the image array are being displayed;

a decoder unit configured to switch and decode one or more layers in the hierarchical data subject to decoding process when a display resolution of one or more moving images in the image array subject to display is changed in response to the user operation input; and a display unit configured to generate and display data for a display screen including decoded one or more moving images in the image array.

13. An image processing method implemented by an information terminal configured to display an image array in response to a user operation, and a server connected to the information terminal via a network and configured to transmit image data to the information terminal, the method comprising:

receiving, in the information terminal, user operation input requesting a change in a size of one or more images in the image array subject to display and transmitting the user operation input to the server;

generating, in the server, hierarchical data representing the each of the images in the image array subject to display in a plurality of resolutions and hierarchized in the order of resolution;

switching and decoding, in the server, one or more layers in the hierarchical data subject to decoding process in accordance with a change in a display resolution of one or more images in the image array subject to display in the information terminal, the change being indicated by the user operation input transmitted from the information terminal;

generating, in the server, the data for a display screen including the decoded one or more images in the image array subject to display;

transmitting, from the server, the data for the display screen to the information terminal; and displaying, in the information terminal, the image array by using data for the display screen which is transmitted from the server in response to the user operation input and in which a size of the one or more images in the image array subject to display is changed.

14. A computer program embedded in a non-transitory computer-readable recording medium, comprising:

an acknowledging module configured to receive, from an information terminal connected via a network, user operation input requesting a change in a size of one or more images in an image array subject to display;

a generation module configured to generate hierarchical data representing each of the images in the image array subject to display in a plurality of resolutions and hierarchized in the order of resolution;

a decoder module configured to switch and decode one or more layers in the hierarchical data subject to decoding process in accordance with a change in a display resolution of the one or more images in the image array subject to display in the information terminal, the change being indicated by the user operation input;

a generation module configured to generate the data for a display screen including the decoded one or more images in the image array subject to display; and a transmission module configured to transmit the data for the display screen to the information terminal so as to display the display screen in which a size of the one or more images in the image array subject to display is changed in the information terminal.

15. A recording medium encoded with a computer program comprising:

an acknowledging module configured to receive, from an information terminal connected via a network, user operation input requesting a change in a size of one or more images in an image array subject to display;

a generation module configured to generate hierarchical data representing the each of the images in the image array subject to display in a plurality of resolutions and hierarchized in the order of resolution;

a decoder module configured to switch and decode one or more layers in the hierarchical data subject to decoding process in accordance with a change in a display resolution of the one or more images in the image array subject to display in the information terminal, the change being indicated by the user operation input;

a generation module configured to generate the data for a display screen including the decoded one or more images in the image array subject to display; and a transmission module configured to transmit the data for the display screen to the information terminal so as to display the display screen in which a size of the one or more images in the image array subject to display is changed in the information terminal.

* * * * *